United States Patent
Tang

(10) Patent No.: US 11,925,905 B2
(45) Date of Patent: Mar. 12, 2024

(54) FORWARD OSMOSIS MEMBRANE AND METHOD OF PREPARING SAME

(71) Applicant: BEIJING BAOSHENGTONG INTERNATIONAL ELECTRIC ENGINEERING TECHNOLOGY CO., LTD., Beijing (CN)

(72) Inventor: Chun Tang, Beijing (CN)

(73) Assignee: BEIJING BAOSHENGTONG INTERNATIONAL ELECTRIC ENGINEERING TECHNOLOGY CO., LTD., Beijing (CN)

( * ) Notice: Subject to any disclaimer, the term of this patent is extended or adjusted under 35 U.S.C. 154(b) by 2 days.

(21) Appl. No.: 17/883,593

(22) Filed: Aug. 8, 2022

(65) Prior Publication Data

US 2023/0076317 A1   Mar. 9, 2023

(30) Foreign Application Priority Data

Sep. 9, 2021   (CN) .......................... 202111053419.X

(51) Int. Cl.
*B01D 69/10* (2006.01)
*B01D 61/00* (2006.01)
(Continued)

(52) U.S. Cl.
CPC ......... *B01D 69/105* (2013.01); *B01D 61/002* (2013.01); *B01D 67/00113* (2022.08);
(Continued)

(58) Field of Classification Search
None
See application file for complete search history.

(56) References Cited

FOREIGN PATENT DOCUMENTS

| CN | 103816811 A | 5/2014 |
|---|---|---|
| CN | 109529623 A | 3/2019 |

(Continued)

OTHER PUBLICATIONS

Lu et al "Performance improvement and biofouling mitigation is osmotic microbeal fuel cells .." Membranes, 2020 (Year: 2020).*
Zou et al "Evaluating the antifouling effects of silver nanoparticles regenerated by TiO2 on forward osmosis membrane" Journal of Membrane Science 454:264-271, 2014 (Year: 2014).*

(Continued)

*Primary Examiner* — Krishnan S Menon
(74) *Attorney, Agent, or Firm* — Cheng-Ju Chiang

(57) ABSTRACT

The forward osmosis membrane and the preparation method thereof provided by the present invention, through fully cover the support mesh layer of the membrane with antibacterial nanoparticles, especially the mixture of nano-Ag and nano TiO2, ensures without reducing the strength, water flux and salt rejection, providing an effective, long-term and comprehensive antibacterial effect. In the present invention, the antibacterial nanoparticles, especially the mixture of nano-Ag and nano-TiO2, are used to carry out antibacterial modification on the support mesh of the forward osmosis membrane, so as to inhibit the growth of bacteria on the forward osmosis membrane, improves the forward osmosis and also improves the safety of the entire purification and filtration system. The antibacterial forward osmosis membrane of the present invention can be applied to the filtration and purification of complex water sources, especially the purification and filtration of eutrophic and bacteria-prone water sources.

12 Claims, 1 Drawing Sheet

(51) Int. Cl.
    *B01D 67/00*          (2006.01)
    *B01D 69/02*          (2006.01)
    *B01D 71/16*          (2006.01)

(52) U.S. Cl.
    CPC ..... *B01D 67/0013* (2013.01); *B01D 67/0083* (2013.01); *B01D 67/0088* (2013.01); *B01D 67/0097* (2013.01); *B01D 69/02* (2013.01); *B01D 69/1071* (2022.08); *B01D 71/16* (2013.01); *B01D 2323/081* (2022.08); *B01D 2323/12* (2013.01); *B01D 2325/04* (2013.01); *B01D 2325/36* (2013.01); *B01D 2325/48* (2013.01)

(56) References Cited

FOREIGN PATENT DOCUMENTS

| | | | | |
|---|---|---|---|---|
| CN | 110523293 A | * | 12/2019 | ........... B01D 61/002 |
| CN | 111974088 A | | 11/2020 | |

OTHER PUBLICATIONS

Xue et al "Binding TiO2 nanoparticles to forward osmosis membranes via MEMO-PMMA-Br monomer chains for enhanced filtration and antifouling performance" RSC Adv., 2018, 8, 19024 (Year: 2018).*

Pan et al "Synthesis of Silver Nanoparticles Embedded Electrospun PAN Nanofiber Thin-Film Composite Forward Osmosis Membrane to Enhance Performance and Antimicrobial Activity", Ind. Eng. Chem. Res. 2019, 58, 984-993 (Year: 2019).*

* cited by examiner

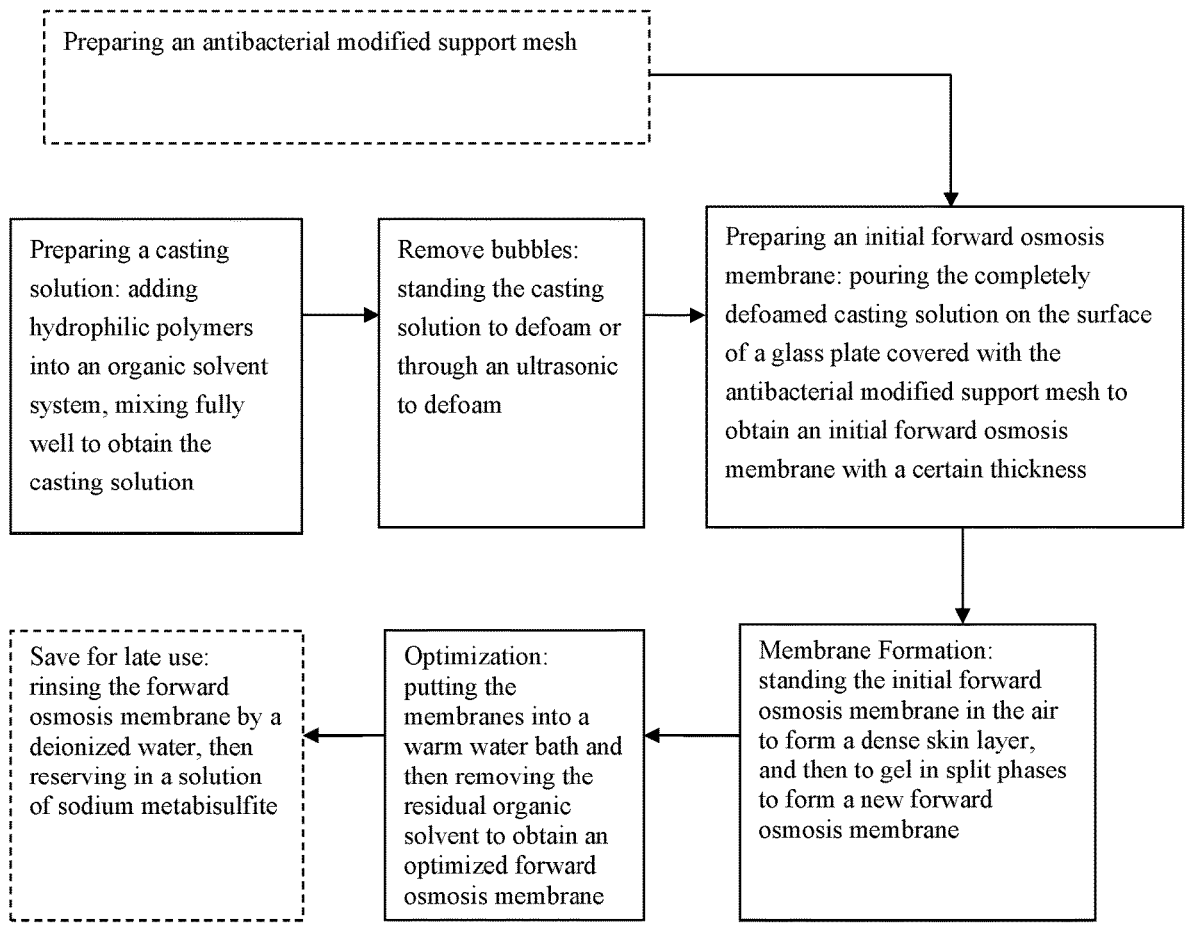

FORWARD OSMOSIS MEMBRANE AND METHOD OF PREPARING SAME

CROSS-REFERENCE TO RELATED APPLICATIONS

This application claims priority to Chinese Patent Application No. 202111053419.X, filed on Sep. 9 2021, the entire disclosure of which is hereby incorporated by reference in its entirety.

TECHNICAL FIELD

This invention relates to macromolecule separation membrane field and its methods of preparing, and more specifically to an antibacterial forward osmosis membrane and preparation method thereof.

BACKGROUND

The forward osmosis process is a process that using the osmotic pressure gradient between the draw solution and the feed solution as the driving force extracts water from the feed solution side with lower osmosis pressure pass through the selectively osmosis membrane and then self-diffuse into the draw solution side with higher osmosis pressure. This process does not require external pressure and energy.

Different from pressure-driven membrane separation processes, such as ultrafiltration, nanofiltration, and reverse osmosis, forward osmosis can operate at low or even non-pressure. Hence, its operation energy consumption is low. Under low pressure operation, the cake layer formed due to non-pressure has the characteristics of low fouling membrane.

And in the case of enough osmotic pressure difference, it can have high water recovery ratio do not achieved by the conventional separation membrane.

Based on the above characters of forward osmosis, forward osmosis technology has been rapidly developed as a new membrane separation technology in recent years.

Meanwhile, it has also become research hotspots of domestic and foreign researchers. It has been broadly applied in the industries of food, pharmacy, energy etc. In many areas, especially in desalination of seawater, drinking water treatment and wastewater treatment, it has demonstrated great prospects.

An ideal forward osmosis should have great hydrophilic, high flux, high salt rejection rate and low internal concentration, durability, good antibacterial performances at the same time. These directions are the hot research directions in this field in recent years. For example, the Chinese patent application CN201811285404.4, which discloses a forward osmosis membrane with no support grid and adding graphene, in order to reduce the thickness of the membrane and strengthen the strength of the membrane through graphene, improve the water flux and reduce the Internal concentration polarization; and the Chinese patent CN201410065806.9, which discloses that by adding chitin nanocrystal particles in triacetate cellulose, it aims to reduce internal concentration polarization, improve hydrophilicity, and reduce internal concentration polarization. Although both of the two patents technologies mentioned that the disclosed technical solutions have antibacterial effects, both of these two technical solutions provided a modified triacetate cellulose membrane layer of a forward osmosis membrane by adding graphene material or chitin nanocrystals into the active layer of the forward osmosis membrane, mainly solves the performance problems of increasing the water flux and reducing the internal concentration polarization, and the effect is not strong in antibacterial.

In recent years, with the understanding of forward osmosis technology, forward osmosis membranes can adapt to more complex water quality, but the existing technologies and products, such as the forward osmosis membranes disclosed in the above-mentioned patent (application) technologies, because of their antibacterial properties insufficient efficiency, couldn't meet the long-term effective use of forward osmosis membrane in complex, nutrient-rich water quality, in the long-term use process of eutrophic raw water is still likely to cause a large number of bacteria to breed on the raw water side and thus fouling and blocking the membrane and affecting the membrane performances. At present, there is an urgent need to provide a comprehensive and high-performance forward osmosis membrane, which has become a key factor in improving forward osmosis efficiency.

SUMMARY

The first purpose of the present invention is to provide a forward osmosis membrane with inhibiting the growth of bacteria and improving the antibacterial effect to improve the performances of the forward osmosis membrane.

Another purpose of the present invention is to provide a method to manufacture the forward osmosis membrane having inhibiting the growth of bacteria and improving the antibacterial effect to improve the performances of the forward osmosis membrane.

To achieve the above purposes, embodiments of the present invention provide a forward osmosis membrane and method of preparing same.

The present invention relates to a forward osmosis membrane. The forward osmosis membrane provided by the present invention has a sequentially stacked membrane structure, and the stacked layer includes a hydrophilic support mesh and a hydrophilic polymer membrane layer, and the support mesh is non-woven or polyester screen modified by antibacterial nanoparticles.

In a preferably embodiment, the antibacterial nanoparticles are a mixture of nano-Ag and nano-TiO2, their mass ratio is: 1:1~1:5; the average particle size of the nano-Ag is 20 nm; the average particle size of nano-TiO2 is 5-10 nm. Preferably, the mass ratio of nano-Ag and nano-TiO2 is: 1:2; more preferably, nano-Ag is 0.2 wt. % (by weight), nano-TiO2 is 0.4 wt. % (by weight) in a modified suspension.

In another preferably embodiment, the thickness of the support mesh is 30 μm-80 μm, and the mesh size is 100-200 meshes; the thickness of the forward osmosis membrane is 30 μm-100 μm; preferably the thickness of support mesh is 30 μm, 50 μm or 70 μm, mesh size is 100 meshes, 120 mesh or 150 mesh; preferably the thickness of the forward osmosis membrane is 30 μm, 50 μm or 70 μm or 100 μm.

In another preferably embodiment, the antibacterial nanoparticle-modified support mesh is prepared by the following method: adding nano-Ag 0.1-0.5 wt. % (by weight) and nano TiO2 0.2-1 wt. % (by weight) into a 2-8 wt. % polyvinyl alcohol aqueous solution by weight, performing ultrasonic dispersion to obtain a modified suspension. Immersing the polyester screen in the suspension, then obtained the antibacterial nanoparticle-modified support mesh by natural drying. Preferably, the mass percentage of nano-Ag is 0.2 wt. %, the mass percentage of nano-TiO2 is 0.4 wt. %, and the polyvinyl alcohol aqueous solution is 4 wt. % by weight.

In another preferably embodiment, the hydrophilic polymer material is selected one of from the group consisting of polyacrylonitrile (PAN), polyacrylate (PA), polymethyl methacrylate, cellulose acetate, cellulose triacetate, polyvinyl alcohol, poly(ethylene oxide), polyvinyl acetate and combinations thereof.

According to another purpose of the invention, the present invention further provides a method for preparing a forward osmosis membrane, comprising:
- (a) Preparing an antibacterial modified support mesh, the support mesh is hydrophilic non-woven fabrics or polyester screens;
- (b) Preparing a casting solution: adding hydrophilic polymers into a water-soluble solvent system, mixing well to obtain the casting solution;
- c) Coating the casting solution prepared in step (b) on the surface of a glass board covered with the antibacterial modified support mesh made at the step (a) to obtain an initial forward osmosis membrane with a certain thickness;
- (d) treating the external layer of the initial forward osmosis membrane, removing the solvent to form a dense skin layer on the external layer to obtain a second initial forward osmosis membrane;
- (e) Performing phase separation film formation or interfacial film formation with the second initial forward osmosis membrane to obtain the forward osmosis membrane.

In another embodiment, the antibacterial modified support mesh is a nano-Ag and nano-TiO2 modified polyester screen, which is prepared by the following method: adding nano-Ag and nano-TiO2 into a polyvinyl alcohol aqueous solution to prepare a suspension, immersing the support mesh into the suspension, and then drying for later use.

In another embodiment, the suspension prepared by follows: adding nano-Ag 0.1-0.5 wt. % (by weight) and nano TiO2 0.2-1 wt. % (by weight) into a 2-8 wt. % polyvinyl alcohol aqueous solution by weight, performing ultrasonic dispersion to obtain a modified suspension. Preferably, the mass percentage of nano-Ag is 0.2 wt. %, the mass percentage of nano-TiO2 is 0.1 wt. %, and the polyvinyl alcohol aqueous solution is 4 wt. % by weight; another preferably, the mass percentage of nano-Ag is 0.2 wt. %, the mass percentage of nano-TiO2 is 0.1 wt. %.

In another embodiment, the thickness of the support mesh is 30 μm-80 μm, and the mesh size is 100-200 meshes; the thickness of the forward osmosis membrane is 30 μm-100 μm; preferably the thickness of support mesh is 30 μm, 50 μm or 70 μm, mesh size is 100 meshes, 120 mesh or 150 mesh; preferably the thickness of the forward osmosis membrane is 30 μm, 50 μm or 70 μm or 100 μm.

In another preferably embodiment, the hydrophilic polymer material is selected one of from the group consisting of polyacrylonitrile (PAN), polyacrylate (PA), polymethyl methacrylate, cellulose acetate, cellulose triacetate, polyvinyl alcohol, poly(ethylene oxide), polyvinyl acetate and combinations thereof; the solvent system solution contains mixtures of 1,4-Dioxane, acetone, methanol and lactic acid. Preferably, the hydrophilic polymer material is 8-15 wt. % (by weight), the 1,4-Dioxane is 30-60 wt. % by weight, the acetone is 5-20 wt. % by weight, the methanol is 5-10 wt. % by weight and the lactic acid is 6-8 wt. % by weight.

In another preferably embodiment, further comprising steps:
- (b-1) defoaming or removing bubbles from the casting solution prepared in the step (b);

the step (c) further including: coating the casting solution removed bubbles which prepared by step (b-1) on the surface of the glass plate covered by the modified antibacterial hydrophilic support mesh, using a film scraper machine to form the initial forward osmosis membrane with a certain thickness;

the treatment of the external layer and removal solvent in the step (d), including standing the initial forward osmosis membrane in the air to make the solvent volatilize and form the dense skin layer on the external layer;

In the step (e), through immersing the second initial forward osmosis membrane into a deionized water to make it gel and split phase to form a membrane;

- (f) immersing the forward osmosis membrane obtained by step (e) into a deionized water to remove the residual organic solvent;
- (g) taking out the forward osmosis membrane and rising it with a deionized water, and then saving it in a sodium metabisulfite solution for later use.

In a preferably embodiment, the hydrophilic support mesh is a polyester mesh (polyester screen) used after a pre-cleaning treatment. The pre-cleaning treatment comprises: soaking the polyester mesh respectively in a solution with 10% (by volume) of sodium hydroxide and a solution with 2% (by volume) of hydrochloric acid for one hour to remove the impurities adsorbed on the surface and then rinsing with a deionized water, then drying for the next step use. The thickness of the initial forward osmotic membrane prepared by the film scraper machine is from 30 μm to 100 μm.

In a preferably embodiment, in the step (b), the mixing condition is to stir the mixtures under a temperature of 30-50° C. for 12-48 hours to make the mixtures evenly mixed; preferably condition is to stir under a temperature of 40° C. for 24 hours. The defoaming method is to keep standing in air for 12-36 hours to achieve fully defoaming or through an assistance of a ultrasonic to defoam; preferably, standing in air for 24 hours; the condition of standing in air is under an environment not be higher than 25° C. temperature and not be lower than 90% humidity, the standing time is from 30 seconds to 90 seconds to form the dense skin layer; further preferably under a temperature of 25° C. and a 90% humidity, with standing 60 seconds. In the step (f), before soaking the membrane into the deionized water, heat treating the membrane into a water bath at approximately 40-50° C. water for 5-20 minutes; the soaking time in the deionized water is 12-36 hours to remove the residuals of the organic solvents; preferably the heat treating into water bath at 50° C. for 15 minutes and soaking in the deionized water for 24 hours; in the step (g), the concentration of the sodium metabisulfite solution is between 0.5-2% (by volume), preferably 1% by volume.

The forward osmosis membrane and the preparation method thereof provided by the present invention, through fully cover the support mesh layer of the membrane with antibacterial nanoparticles, especially the mixture of nano-Ag and nano TiO2, ensures without reducing the strength, water flux and salt rejection, providing an effective, long-term and comprehensive antibacterial effect. In the present invention, the antibacterial nanoparticles, especially the mixture of nano-Ag and nano-TiO2, are used to carry out antibacterial modification on the support mesh of the forward osmosis membrane, so as to inhibit the growth of bacteria on the forward osmosis membrane, improves the forward osmosis and also improves the safety of the entire purification and filtration system. The antibacterial forward osmosis membrane of the present invention can be applied to the filtration and purification of complex water sources, especially the purification and filtration of eutrophic and bacteria-prone water sources; in addition, the safety of nano-Ag has been recognized commercially, and its material has been widely used in baby products such as cutlery and feeding bottles.

BRIEF DESCRIPTION OF DRAWINGS

The FIGURE shows a process flow diagram of making the inventive forward osmosis membrane.

DESCRIPTION OF EMBODIMENTS

In order to further implicate the technique means and effects adopted by the present invention to achieve the predetermined purposes, the following in conjunction with the drawings and preferred embodiments, the forward osmosis membrane proposed according to the present invention and its preparation method, including embodiments, structure, preparation methods, features and efficacy are described below. The embodiments are provided in the application aim at further descript the present invention, but the described embodiments are only used to illustrate the present invention and not to limit the present invention.

The FIGURE shows an illustrative example of a process for preparing a forward osmosis membrane of the present invention, the detailed production technique procedures are as follows:

1. Preparing an antibacterial support mesh: the support mesh is hydrophilic non-woven fabrics or polyester screens. Further preferably to preparing a polyester mesh modified by nano-Ag and nano-TiO2. The method is adding nano-Ag and nano-TiO2 into a polyvinyl alcohol aqueous solution to prepare a suspension, immersing the support mesh into the suspension, and then drying naturally for later use.
2. Preparing a casting solution: adding hydrophilic polymers into an organic solvent system, mixing well to obtain the casting solution. Further preferably, adding the hydrophilic polymer materials into a mixed solution of water-soluble organic solvent system, stirring at a temperature of 30° C.-50° C. for 12-48 hours to obtain the uniform casting solution. In the present invention, it is further preferable to add cellulose triacetate into the mixed solution of 1,4-dioxane, acetone, methanol and lactic acid, and stir at a temperature of 40° C. for 24 hours to obtain the uniform casting solution.
3. Defoaming or removal bubbles: keeping casting solution prepared in the step 2 standing in air for 12-36 hours to achieve fully defoaming or through an assistance of a ultrasonic to defoam; preferably, keep the casting solution standing in air for 24 hours to defoam fully.
4. Preparing an initial forward osmosis membrane: coating the casting solution defoamed fully on the surface of a glass board covered with the antibacterial modified support mesh, using a film scraper machine to scrape to obtain the initial forward osmosis membrane with a certain thickness;
5. Membrane formation: standing the initial forward osmosis membrane obtained from the step 4 in air under a certain temperature and humidity for seconds to form a dense skin layer, then immersing the membrane with the dense skin layer into a deionized water to gel in split phases to form a new forward osmosis membrane; preferably, the air temperature is not higher 25° C. and humidity equals or above 90%, standing in air for 30-90 seconds.
6. Optimization: putting the forward osmosis membrane obtained from the step 5 into hot water bath (40-50° C.) for 5-20 minutes, and then soaking in a deionized water for 24 hours to remove the residual organic solvent to obtain an optimized forward osmosis membrane;
7. Save for late use: taking out the optimized forward osmosis membrane prepared by the step 6, rinsing by a deionized water, and then reserving in a solution of 0.5-2% sodium metabisulfite by volume; preferably, the solution of sodium metabisulfite is 1% by volume.

The preparation method of the forward osmosis membrane of the present invention is further described as follows:

Preparing the nano-Ag and nano-TiO2 modified polyester screen: adding nano-Ag 0.1-0.5 wt. % (by weight) and nano TiO2 0.2-1 wt. % (by weight) into a 2-8 wt. % polyvinyl alcohol aqueous solution by weight, performing ultrasonic dispersion to obtain a modified suspension, immersing the support mesh into the suspension, then drying for later use;

Preparing the casting solution: Adding an 8-15 wt. % (by weight) cellulose triacetate into a mixed solution including 5-20 wt. % acetone, 5-10 wt. % methanol, and 6-8% lactic acid and the remainder is 1,4-Dioxane, stirring at 40° C. for 24 hours to obtain a homogeneous casting solution; Standing the casting solution obtained by here for 24 hours to defoam thoroughly or through assistance from ultrasonic to defoam;

Pouring the completely defoamed casting solution on a surface of a glass plate covered with the modified polyester mesh, and scraping by a film scraper machine to form an initial forward osmosis membrane with thickness 30-100 μm. Standing the initial forward osmosis membrane obtained from the up said step in air under the temperature of 25° C. and humidity 90% for 60-90 seconds to form a dense skin layer, and then, immersing the membrane with the dense skin layer into a deionized water to gel in split phases to form a new forward osmosis membrane. The thickness of the modified polyester mesh is 30 μm-80 μm, preferably 30 μm, 50 μm or 70 μm.

Heat treating the forward osmosis membrane obtained by gel and split phase into a water bath at approximately 40-50° C. water for 5-15 minutes; and then soaking the membrane into the deionized water for 24 hours to remove the residuals of the organic solvents.

The antibacterial forward osmosis membrane produced in the above procedures, when using a 0.5 mol/L sodium chloride solution by volume as a draw solution, and using a 0.01 mol/L magnesium sulfate solution by volume as a feed solution, the membrane flux can reach 8-13 L/(m$^2$*h), the rejection of the magnesium sulfate is above 97%, the antibacterial rate is above 90%, even under an anti-bacterial durability test the antibacterial rate reveals a result of above 90%.

The present invention will be described in further detail below through specific embodiments.

Embodiment 1

1. Soaking a polyester mesh (30 μm thick, 100 mesh) respectively into a solution with 2% (by volume) hydrochloric acid, and a solution with 10% (by volume) sodium hydroxide for one hour to remove the impurities adsorbed on the surface, and then rinsing with a deionized water, then drying for use in next step use;

2. Preparing a nano-Ag and nano-TiO2 modified polyester mesh: adding nano-Ag 0.2 wt. % (by weight) and nano TiO2 0.4 wt. % (by weight) into a 4 wt. % polyvinyl alcohol aqueous solution by weight, performing ultrasonic dispersion to obtain a modified suspension, immersing the support mesh into the suspension, then drying for later use;

3. Adding a 13 wt. % (by weight) cellulose triacetate into a mixed solution including 19 wt. % acetone, 8 wt. % methanol, and 6 wt % lactic acid and 54 wt. % 1,4-Dioxane, stirring at 40° C. for 24 hours to obtain a homogeneous casting solution;

W4. Standing the casting solution obtained by step 3 for 24 hours to defoam thoroughly or through assistance from ultrasonic to defoam;

5. Pouring the completely defoamed casting solution on a surface of a glass plate covered with polyester mesh (thickness 30 μm) prepared by step 1, and scraping by a film scraper machine to form an initial forward osmosis membrane with thickness 50 μm;

6. Standing the initial forward osmosis membrane obtained from the step (5) in air under the temperature of 25° C. and humidity 90% for 30 seconds to form a dense skin layer, and then, immersing the membrane with the dense skin layer into a deionized water to gel in split phases to form a new forward osmosis membrane;

7. Putting the forward osmosis membrane obtained from the step (6) into hot water bath 50° C. for 15 minutes, and then soaking the forward osmosis membrane into a deionized water for 24 hours to remove the residual organic solvent to obtain an optimized forward osmosis membrane.

The performances of the forward osmosis membrane:
The forward osmosis membrane produced in the above procedures having a thickness of 50 μm, when using a 0.5 mol/L sodium chloride by volume as a draw solution, and using a 0.01 mol/L magnesium sulfate solution by volume as a feed solution, the membrane flux can reach 12.5 L/(m$^2$*h), the rejection of the magnesium sulfate is 97.8%, the antibacterial rate is 95%, even under an anti-bacterial durability test the antibacterial rate reveals a result of 93%. The detailed performances test is shown in table 1.

Embodiment 2

1. Soaking a polyester mesh (50 μm thick, 100 mesh) respectively into a solution with 2% (by volume) hydrochloric acid, and a solution with 10% (by volume) sodium hydroxide for one hour to remove the impurities adsorbed on the surface, and then rinsing with a deionized water, then drying for use in next step use;

2. Preparing a nano-Ag and nano-TiO2 modified polyester mesh: adding nano-Ag 0.2 wt. % (by weight) and nano TiO2 0.4 wt. % (by weight) into a 4 wt. % polyvinyl alcohol aqueous solution by weight, performing ultrasonic dispersion to obtain a modified suspension, immersing the support mesh into the suspension, then drying for later use;

3. Adding a 13 wt. % (by weight) cellulose triacetate into a mixed solution including 19 wt. % acetone, 8 wt. % methanol, and 6 wt % lactic acid and 54 wt. % 1,4-Dioxane, stirring at 40° C. for 24 hours to obtain a homogeneous casting solution;

4. Standing the casting solution obtained by step 3 for 24 hours to defoam thoroughly or through assistance from ultrasonic to defoam;

5. Pouring the completely defoamed casting solution on a surface of a glass plate covered with polyester mesh (thickness 50 μm) prepared by step 1, and scraping by a film scraper machine to form an initial forward osmosis membrane with thickness 70 μm;

6. Standing the initial forward osmosis membrane obtained from the step (5) in air under the temperature of 25° C. and humidity 90% for 60 seconds to form a dense skin layer, and then, immersing the membrane with the dense skin layer into a deionized water to gel in split phases to form a new forward osmosis membrane;

7. Putting the forward osmosis membrane obtained from the step (6) into hot water bath 45° C. for 20 minutes, and then soaking the forward osmosis membrane into a deionized water for 24 hours to remove the residual organic solvent to obtain an optimized forward osmosis membrane.

The performances of the forward osmosis membrane:
The forward osmosis membrane produced in the above procedures having a thickness of 70 μm, when using a 0.5 mol/L sodium chloride by volume as a draw solution, and using a 0.01 mol/L magnesium sulfate solution by volume as a feed solution, the membrane flux can reach 11.0 L/(m$^2$*h), the rejection of the magnesium sulfate is 98.1%, the antibacterial rate is 94%, even under an anti-bacterial durability test the antibacterial rate reveals a result of 92%. The detailed performances test is shown in table 1.

Embodiment 3

1. Soaking a polyester mesh (50 μm thick, 100 mesh) respectively into a solution with 2% (by volume) hydrochloric acid, and a solution with 10% (by volume) sodium hydroxide for one hour to remove the impurities adsorbed on the surface, and then rinsing with a deionized water, then drying for use in next step use;

2. Preparing a nano-Ag and nano-TiO2 modified polyester mesh: adding an nano-Ag 0.2 wt. % (by weight) and an nano TiO2 0.4 wt. % (by weight) into a 4 wt. % polyvinyl alcohol aqueous solution by weight, performing ultrasonic dispersion to obtain a modified suspension, immersing the support mesh into the suspension, then drying for later use;

3. Adding a 10 wt. % (by weight) cellulose triacetate into a mixed solution including 19 wt. % acetone, 8 wt. % methanol, and 6 wt % lactic acid and 57 wt. % 1,4-Dioxane, stirring at 40° C. for 24 hours to obtain a homogeneous casting solution;

4. Standing the casting solution obtained by step 3 for 24 hours to defoam thoroughly or through assistance from ultrasonic to defoam;

5. Pouring the completely defoamed casting solution on a surface of a glass plate covered with polyester mesh (thickness 50 μm) prepared by step 1, and scraping by a film scraper machine to form an initial forward osmosis membrane with thickness 100 μm;

6. Standing the initial forward osmosis membrane obtained from the step (5) in air under the temperature of 25° C. and humidity 90% for 80 seconds to form a dense skin layer, and then, immersing the membrane with the dense skin layer into a deionized water to gel in split phases to form a new forward osmosis membrane;

7. Putting the forward osmosis membrane obtained from the step (6) into hot water bath 40° C. for 15 minutes, and then soaking the forward osmosis membrane into a deionized water for 24 hours to remove the residual organic solvent to obtain an optimized forward osmosis membrane.

The performances of the forward osmosis membrane:

The forward osmosis membrane produced in the above procedures having a thickness of 100 μm, when using a 0.5 mol/L sodium chloride by volume as a draw solution, and using a 0.01 mol/L magnesium sulfate solution by volume as a feed solution, the membrane flux can reach 10.5 L/(m$^2$*h), the rejection of the magnesium sulfate is 98.2%, the antibacterial rate is 95%, even under an anti-bacterial durability test the antibacterial rate reveals a result of 93%. The detailed performances test is shown in table 1.

TABLE 1 shows an illustration of using a solution with 0.5 mol/L sodium chloride by volume as a draw solution, a 0.01 mol/L magnesium sulfate solution by volume as a feed solution to evaluate the performances of the forward osmosis membrane provided by the embodiments.

| Items | Membrane thickness/ Polyester mesh | Membrane Flux Day 1 | Rejection salt Day 1 | Antibacterial rate Day 1 | Membrane Flux Day 10 | Rejection salt Day 10 | Antibacterial rate Day 10 |
|---|---|---|---|---|---|---|---|
| Emb.1 | 30/50 | 12.5 L (m$^2$ * h) | 97.8% | 95% | 10.4 L/(m$^2$ * h) | 97.9% | 93% |
| Emb.2 | 50/70 | 11.0 L (m$^2$ * h) | 98.1% | 94% | 10.8 L/(m$^2$ * h) | 98.0% | 92% |
| Emb.3 | 50/100 | 10.5 L (m$^2$ * h) | 98.2% | 95% | 10.5 L/(m$^2$ * h) | 98.1% | 93% |

In the table 1, it shows clearly that the forward osmosis membrane of the present invention added antibacterial support mesh have demonstrated strong antibacterial functions, and the performances of the membrane is not affected even after 10 days of immersion in a eutrophication-rich raw water, after simple washing to test, its antibacterial capability is still above 90%, and the performances of membrane flux and salt rejection are not affected.

While for the existing forward osmosis membrane composed of cellulose triacetate and other existing available forward osmosis membrane products, because they do not have strong antibacterial features, as the soaking time gets longer, the biological breeding more, and the membranes' performance declines more severely.

In the present invention, the concentration of sodium hydroxide, hydrochloric acid and sodium metabisulfite are computed by volume.

In the present invention, the wt. % means percentage by weight.

In the inventive forward osmosis membrane and the preparation method thereof provided, the forward osmosis membrane is a membrane with an antibacterial modified support mesh, which can inhibit the growth of bacteria under the environmental conditions of nutrient-rich raw water, improving the permeability of the forward osmosis membrane, ensuring the membrane can be used effectively for a long time, prolonging the service life of the forward osmosis membrane system and reducing the cost of use.

In the specification, the invention has been described with reference to specific embodiments thereof. However, it is very obviously that there are many various modifications and changes which can be made without deviated or departure from the spirit and scope of the invention. Accordingly, the specification and drawings presented in the invention are to descript and illustrate the invention rather than to limit or restrict the invention.

What is claimed is:

1. A forward osmosis membrane, wherein the forward osmosis membrane has a sequentially stacked membrane structure, the stacked layer includes a hydrophilic support mesh and a hydrophilic polymer membrane layer, and the support mesh is non-woven or polyester screen modified by antibacterial nanoparticles; the antibacterial nanoparticle-modified support mesh is prepared by the following method: adding nano-Ag 0.1-0.5 wt. % (by weight) and nano TiO2 0.2-1 wt. % (by weight) into a 2-8 wt. % polyvinyl alcohol aqueous solution by weight, performing ultrasonic dispersion to obtain a modified suspension, immersing the polyester screen into the suspension, then obtained the antibacterial nanoparticle-modified support mesh by natural drying; the average particle size of the nano-Ag is 20 nm; the average particle size of nano-TiO2 is 5-10 nm; when using a 0.5 mol/L sodium chloride solution by volume as a draw solution, and using a 0.01 mol/L magnesium sulfate solution by volume as a feed solution, the membrane flux can reach 8-13 L/(m$^2$*h), the rejection of the magnesium sulfate is above 97%, the antibacterial rate is above 90%, and the performances of the membrane is not affected even after 10 days of immersion in a eutrophication-rich raw water, after washing to test, its antibacterial capability is still above 90%.

2. The forward osmosis membrane of claim 1, wherein the mass ratio of nano-Ag and nano-TiO2 is: 1:2.

3. The forward osmosis membrane of claim 1, wherein the thickness of the support mesh is 30 μm-80 μm, the mesh size is 100 meshes-200 meshes; the thickness of the forward osmosis membrane is 50 μm-100 μm.

4. The forward osmosis membrane of claim 3, wherein the thickness of the support mesh is 30 μm or 50 μm or 70 μm, the mesh size is 100 meshes or 120 meshes or 150 meshes; the thickness of the forward osmosis membrane is 50 μm, 70 μm or 100 μm.

5. The forward osmosis membrane of claim 1, the hydrophilic polymer material is selected one of from the group consisting of polyacrylonitrile (PAN), polyacrylate (PA), polymethyl methacrylate, cellulose acetate, cellulose triacetate, polyvinyl alcohol, poly(ethylene oxide), polyvinyl acetate and combinations thereof.

6. A method of preparing for a forward osmosis membrane, comprising:
(a) preparing an antibacterial modified support mesh: the support mesh is hydrophilic non-woven fabrics or polyester screens; the polyester mesh is modified by nano-Ag and nano-TiO$_2$; the method of preparing is adding nano-Ag 0.1-0.5 wt. % (by weight) and nano TiO2 0.2-1 wt. % (by weight) into a 2-8 wt. % polyvinyl alcohol aqueous solution by weight, performing ultrasonic dispersion to obtain a modified suspension, immersing the support mesh into the suspension, and then drying naturally;

(b) preparing a casting solution: adding hydrophilic polymers into a water-soluble solvent system mixing well to obtain the casting solution;

(c) coating the casting solution prepared in step (b) on the surface of a glass board covered with the antibacterial modified support mesh made at the step (a) to obtain an initial forward osmosis membrane with a certain thickness;

(d) treating an external layer of the initial forward osmosis membrane by removing the solvent, and forming a dense skin layer on the external layer to obtain a second initial forward osmosis membrane;

(e) performing phase separation film formation or interfacial film formation with the second initial forward osmosis membrane to obtain the forward osmosis membrane;

the average particle size of the nano-Ag is 20 nm; the average particle size of nano-TiO2 is 5-10 nm;

when using a 0.5 mol/L sodium chloride solution by volume as a draw solution, and using a 0.01 mol/L magnesium sulfate solution by volume as a feed solution, the membrane flux can reach 8-13 L/(m$^2$*h), the rejection of the magnesium sulfate is above 97%, the antibacterial rate is above 90%, and the performances of the membrane is not affected even after 10 days of immersion in a eutrophication-rich raw water, after washing to test, its antibacterial capability is still above 90%.

7. The method of preparing for a forward osmosis membrane of claim 6,
wherein the thickness of the support mesh is 30 µm-80 µm, the mesh size is 100 meshes-200 meshes; the thickness of the forward osmosis membrane is 50 µm-100 µm.

8. The method of preparing for a forward osmosis membrane of claim 7,
wherein the thickness of the support mesh is 30 µm or 50 µm or 70 µm, the mesh size is 100 meshes or 120 meshes or 150 meshes; the thickness of the forward osmosis membrane is 50 µm, 70 µm or 100 µm.

9. The method of preparing for a forward osmosis membrane of claim 6,
wherein the hydrophilic polymer material is selected one of from the group consisting of polyacrylonitrile (PAN), polyacrylate (PA), polymethyl methacrylate, cellulose acetate, cellulose triacetate, polyvinyl alcohol, poly(ethylene oxide), polyvinyl acetate and combinations thereof.

10. The method of preparing for a forward osmosis membrane of claim 6, further comprising:
(b-1) defoaming or removing bubbles from the casting solution prepared in the step (b);
the step (c) further including: coating the casting solution removed bubbles which prepared by step (b-1) on the surface of the glass plate covered by the modified antibacterial hydrophilic support mesh, using a film scraper machine to scrap to form the initial forward osmosis membrane with a certain thickness;
the treatment of the external layer and removal solvent in the step (d), including standing the initial forward osmosis membrane in the air to make the solvent volatilize and form the dense skin layer on the external layer;
in the step (e), through immersing the second initial forward osmosis membrane into a deionized water to make it gel and split phase to form a membrane;
(f) immersing the forward osmosis membrane obtained by step (e) into a deionized water to remove the residual organic solvent;
(g) taking out the forward osmosis membrane and rising it with a deionized water, and then saving it in a sodium metabisulfite solution for later use.

11. The method of preparing for a forward osmosis membrane of claim 10, wherein the thickness of the support mesh is 30 µm or 50 µm or 70 µm, the mesh size is 100 meshes or 120 meshes or 150 meshes; used after a pre-cleaning treatment, the pre-cleaning treatment comprises: soaking the polyester mesh respectively in a solution with 10% of sodium hydroxide by volume and a solution with 2% of hydrochloric acid by volume for one hour to remove impurities adsorbed on the surface and then rinsing with a deionized water, then drying for the next step use; the thickness of the initial forward osmotic membrane prepared by the film scraper machine is from 30 µm to 100 µm.

12. The method of preparing for a forward osmosis membrane of claim 11, wherein in the step (b), a mixing condition is to stir mixtures under a temperature of 30-50° C. for 12-48 hours to make the mixtures evenly mixed;
the defoaming method is to keep standing in air for 12-36 hours to achieve fully defoaming or through an assistance of a ultrasonic to defoam; the condition of standing in air is under an environment not be higher than 25° C. temperature and not be lower than 90% humidity, the standing time is from 30 seconds to 90 seconds to form the dense skin layer;
in the step (f), before soaking the membrane into the deionized water, heat treating the membrane into a water bath at 40-50° C. water for 5-20 minutes; the soaking time in the deionized water is 12-36 hours to remove the residuals of the organic solvents;
in the step (g), the concentration of the sodium metabisulfite solution is between 0.5-2% by volume.

* * * * *